April 8, 1958   A. A. LAHTI   2,829,843
SPEED CONTROL FOR SPOOLING SYSTEMS
Filed June 21, 1954   3 Sheets-Sheet 1
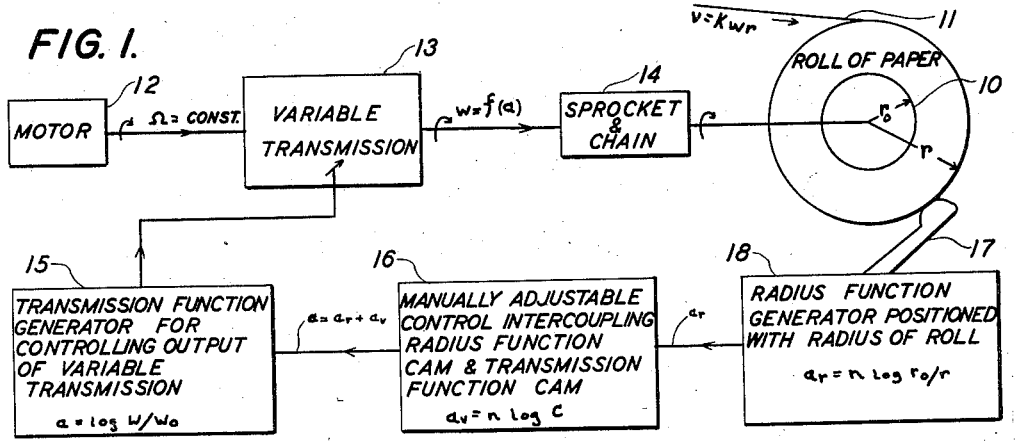
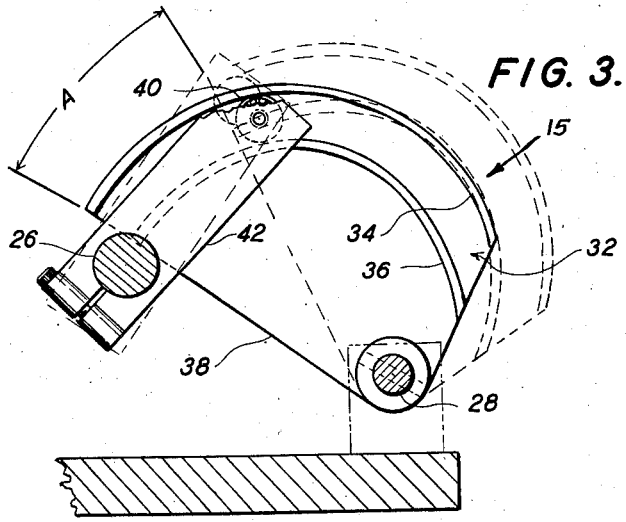
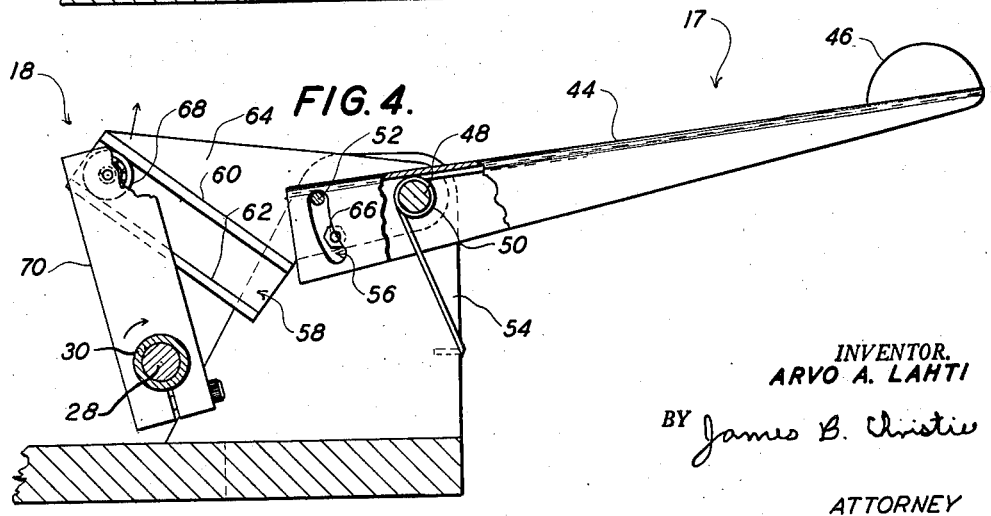
INVENTOR.
ARVO A. LAHTI
BY James B. Christie
ATTORNEY April 8, 1958    A. A. LAHTI    2,829,843
SPEED CONTROL FOR SPOOLING SYSTEMS
Filed June 21, 1954    3 Sheets-Sheet 2

INVENTOR.
ARVO A. LAHTI
BY James B. Christie
ATTORNEY

April 8, 1958 A. A. LAHTI 2,829,843
SPEED CONTROL FOR SPOOLING SYSTEMS
Filed June 21, 1954 3 Sheets-Sheet 3

INVENTOR.
ARVO A. LAHTI
BY James B. Christie
ATTORNEY

United States Patent Office 2,829,843
Patented Apr. 8, 1958

2,829,843

SPEED CONTROL FOR SPOOLING SYSTEMS

Arvo A. Lahti, Pasadena, Calif., assignor, by mesne assignments, to Consolidated Electrodynamics Corporation, Pasadena, Calif., a corporation of California Application June 21, 1954, Serial No. 437,959

4 Claims. (Cl. 242—55)

This invention relates to apparatus for controlling the speed at which material is spooled onto a roller so that the lineal velocity of the material is substantially constant, with an adjustment being provided for selecting a desired lineal velocity for the material.

In many applications in which lengthy materials, such as photographic film or paper, are passed through a process or the like, the material is wrapped on a roller after being drawn through the process. As additional material is wrapped around the roll, its radius increases, and if the roller velocity is constant the material will be drawn through the process at a progressively increasing velocity. This is ordinarily undesirable and requires that means be provided for spooling the material at a constant lineal velocity so that a roll of uniformly processed material may be obtained. Also, if materials are passed from time to time through the same process, it is desirable to provide means for adjusting the lineal velocity of the material so that inherent variations in the process may be compensated.

Ordinarily the surface velocity of such a roll is maintained substantially constant by decreasing the speed of rotation of the roll as the radius of the roll increases. Such an arrangement provides a substantially constant lineal velocity for the material which is wound onto the roll, but it is difficult to adjust the velocity within a selected range while maintaining it constant.

This difficulty is overcome in the present invention by providing mechanical means for decreasing the speed of rotation of the roll as the radius of the roll increases so as to provide a constant surface velocity on the roll, and by providing a manually operated, continuous-type adjustment in the mechanical arrangement for altering the speed of rotation of the roll so as to select a desired lineal velocity for the material which is spooled onto the roll and so as to easily make subsequent adjustments of the original setting to compensate for inherent variations in the process.

In accordance with the present invention, I provide a constant-speed motor which drives the roll through a variable transmission. The variable transmission is controlled by mechanical means, including an arrangement for sensing the radius of the roll, which varies the speed of rotation of the roll inversely with the radius of the roll to provide a substantially constant lineal velocity for the material being wound on the roll.

The arrangement for sensing the radius of the roll serves to produce a function which varies with the radius of the roll. This function is added to an adjustable function which is produced by a manually-adjustable function generator which may be adjusted in a continuous fashion, and the sum is applied to another function generator which controls the variable transmission. The manually-adjustable function generator serves to permit a continuous-type of manual adjustment of the speed of rotation of the roll so that the lineal velocity of the material being wound onto the roll can be adjusted easily and accurately, with the lineal velocity remaining constant until the manually-adjustable function generator is readjusted.

In a preferred embodiment of the invention, a cam is provided for controlling the output of the variable transmission, and this cam is initially positioned by a manually-adjustable control in order to provide the desired lineal velocity for the material which is spooled onto the roll. The apparatus for sensing the radius of the roll is coupled through the manually-adjustable control to the cam which controls the variable transmission, and it serves to compensate for increases in the radius of the roll of material so as to provide a substantially constant lineal velocity for the material which is spooled onto the roll.

Since this arrangement employs only mechanical means for effecting speed control, it is reliable even when subjected to rough usage and it requires very little maintenance.

The invention is explained with reference to the drawings, in which:

Fig. 1 is a block diagram illustrating the invention;

Fig. 3 is a sectional view taken on line 3—3 of Fig. 2 showing the cam for controlling the variable transmission;

Fig. 4 is a sectional view taken on line 4—4 of Fig. 2 showing the radius sensor;

Figure 2:
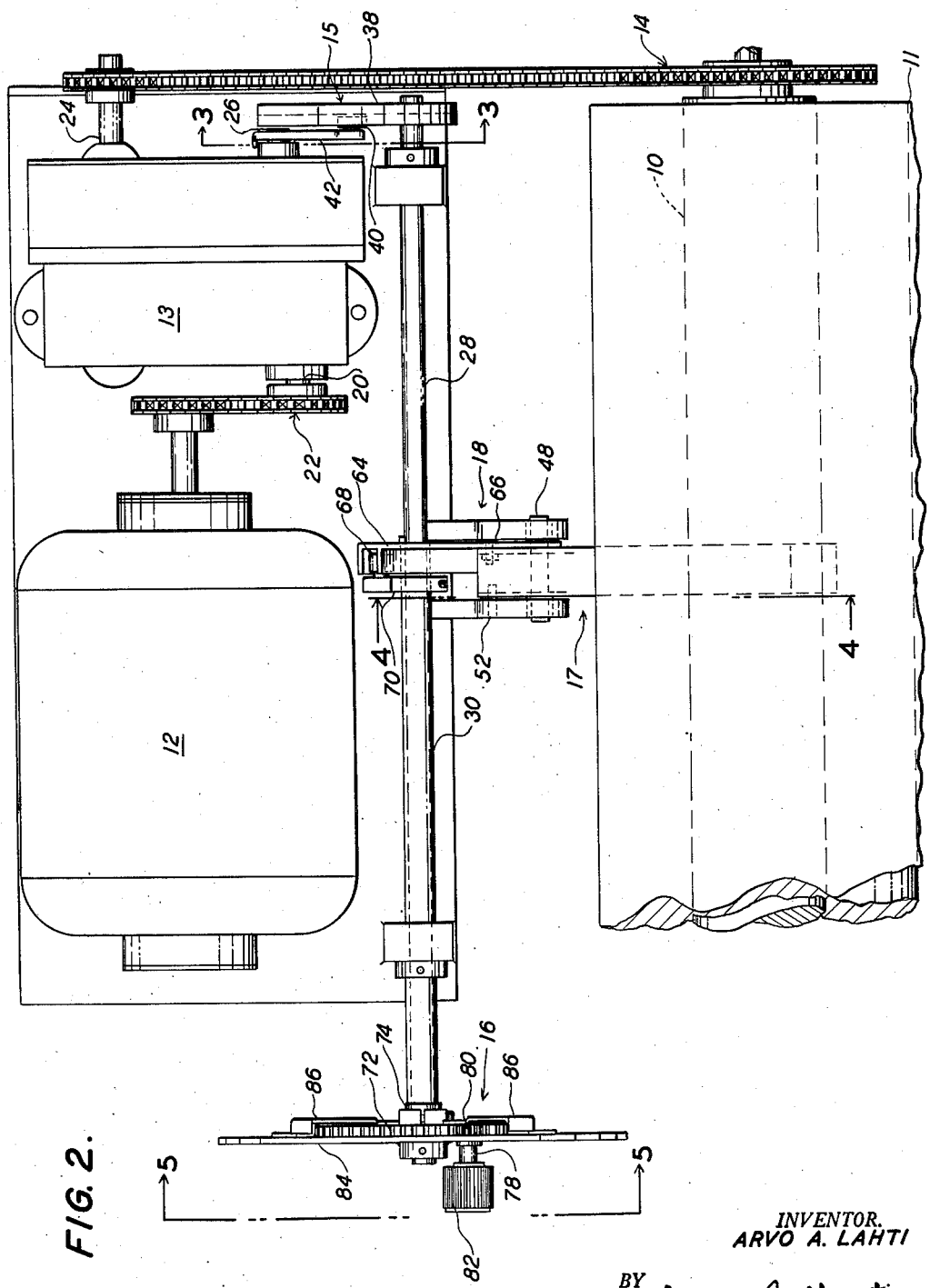
Fig. 2 is a plan view showing a mechanical arrangement of the apparatus of Fig. 1.

Referring to Fig. 1, a roller 10 is provided to receive paper 11 which, for example, may have been drawn through a chemical bath by the action of the roller. The roller 10 is driven by a constant speed motor 12 through a continuously variable transmission 13 and a sprocket and chain arrangement 14. The speed of rotation of the roller and hence the lineal velocity of the paper is determined by the transmission ratio of the variable transmission.

A transmission function generator 15 serves to control the output of the variable transmission 13. A manually-adjustable control 16 is provided to position the transmission function generator so that a desired paper velocity can be selected.

As the paper is spooled onto the roller 10, the radius of the roll of paper increases, and the speed of rotation of the roller must be decreased in order to cause the paper to be drawn onto the roller at a constant lineal speed. A follower arm 17 engages the outer periphery of the roll of paper. The follower arm positions a radius function generator 18 in accordance with the radius of the roll. The position of the radius function generator is transmitted through the manually-adjustable control 16 to control the transmission function generator 15 and cause it to compensate for increases in the radius of the roll of paper so as to provide a substantially constant lineal velocity for the paper as it is spooled onto the roll.

Thus, the lineal velocity of the paper is determined by the setting of the adjustable control 16, and this velocity is maintained substantially constant by means of the follower arm 17 which acts through the adjustable control 16 so that their displacements are combined to control the variable transmission.

The operation of the invention may be described in mathematical terms as follows: The radius function generator 18 is arranged to generate a position proportional to the longarithm of the reciprocal of the radius of the roll, which may be expressed as $$a_r = n \log \frac{r_0}{r} \quad (1)$$

where $a_r$ is the position generated, $n$ is an arbitrary system constant, $r_0$ is an arbitrary radius, such as the radius of the roller, and $r$ is the radius of the roll of paper.

The position $a_v$ which is generated by the manually-adjustable control 16 may be expressed as $$a_v = n \log C \quad (2)$$

where $C$ is an arbitrarily-inserted parameter which is determined by the setting of the manually-adjustable control 16.

The output $a_r$ of the radius function generator 18 is added to the output $a_v$ of the manually-adjustable control 16, and the combined output $a$ may be expressed as $$a = a_r + a_v \quad (3)$$

This combined output is employed to control the transmission function generator 15 in such manner that $$a = n \log \frac{w}{w_0} \quad (4)$$

where $w$ is the angular velocity of the output of the variable transmission, and $w_0$ is an arbitrary angular velocity, such as the maximum angular velocity required under any operating condition.

By substituting into Equation 3 the values of $a$, $a_r$, and $a_v$ indicated in Equations 4, 1 and 2, the expression $$n \log \frac{w}{w_0} = n \log \frac{r_0}{r} + n \log C \quad (5)$$

is derived. By adding the terms on the right side, dividing by $n$ and taking the anti-logarithms the expression $$w = \frac{r_0}{r} C w_0 \quad (6)$$

is obtained.

By inspection, it may be noticed that the lineal velocity $v$ of the medium being rolled is $$v = kwr \quad (7)$$

where $k$ is a system constant determined by the angular linkage such as the sprocket and chain arrangement 14 between the variable transmission and the roller. By substituting Equation 6 into Equation 7 the expression $$v = k r_0 C w_0 \quad (8)$$

is obtained. It is apparent that the velocity $v$ is now invariant with respect to the radius $r$ of the roll of material and that it is directly proportional to the inserted parameter $C$, which is provided by the manually-adjustable control 16.

Figs. 2 to 6 show a preferred mechanical arrangement for the apparatus illustrated in Fig. 1.

The armature of the constant speed motor 12 is coupled to the input shaft 20 of the variable transmission 13 through a sprocket and chain drive 22. The output shaft 24 of the variable transmission is coupled to the roller 10 through a sprocket and chain assembly 14.

The speed of rotation of the roller 10 is controlled by a control shaft 26 on the variable transmission, and the angular position of this shaft is controlled by the transmission function cam 15.

The transmission function cam 15 is connected to the manually-adjustable control 16 by a shaft 28. A hollow shaft 30, which is disposed concentrically about the shaft 28, serves to connect the manually-adjustable control 16 to the radius function cam 18. The radius function cam 18 is controlled by the follower arm 17 which rides on the outer periphery of the roll of paper.

The radius sensor arm 17 serves to position the radius function cam 18 in accordance with the radius of the roll of paper which is carried on roller 10. The position of the radius function cam 18 is transmitted through the shaft 30, the adjustable control 16, and the shaft 28 to control the transmission function cam 15. The adjustable control 16 rotates as a unit with rotation of the shaft 30, and it serves to control the angular relationship between the shafts 28 and 30. Thus, in effect, the angular displacement which is provided by the adjustable control 16 is added to the variable angular displacement which is provided by the cam 18, so that the angular displacement of the control shaft 28 is equal to the sum of the angular displacements of the radius function cam 18 and the adjustable control 16.

Figs. 3 to 6 show suitable arrangements for the cams 15 and 18 and for the adjustable control 16.

As shown in Fig. 3, the transmission function cam 15 comprises a channel 32 which is defined by a pair of parallel flanges 34, 36. The flanges are affixed to a plate 38 which is affixed to the shaft 28, which is connected to the adjustable control 16. A roller bearing 40 rides in the channel 32 of the cam, and it is connected through a lever 42 to the control shaft 26 of the variable transmission. Thus, the shaft 28 serves to position the cam 15, which in turn controls the angular position of the control shaft of the variable transmission, thereby controlling the speed of rotation of the output shaft 24 of the variable transmission.

As shown in Fig. 4, the follower arm 17 comprises an arm 44 having a rounded nib 46 at its end which serves to engage the outer periphery of the roll of paper. The arm 44 is pivoted on a pin 48, and a spring 50 serves to urge the outer end of the arm upwardly, as viewed in Fig. 4. A pin 52, which is affixed to the framework 54, extends through a slot 56 in the radius sensor arm, and it defines the limits of movement of the arm.

The radius function cam 18 comprises a channel 58 which is defined by a pair of flanges 60, 62. The flanges are affixed to a plate 64 which is pivoted on the pin 48 along with the follower arm and which is affixed to the follower arm by the nut and screw arrangement 66, so that the plate 64 and hence the channel 58 are moved in accordance with movement of the follower arm. A roller bearing 68 rides in the channel 58, and it is connected to the shaft 30 by a lever 70.

Thus, the angular position of the shaft 30 is controlled by the position of the radius function cam 18, which in turn is controlled by the position of the follower arm 17.

The cams 15 and 18 of Figs. 3 and 4 are shaped to provide the functions indicated in Equations 4 and 1 respectively.

Figure 5:
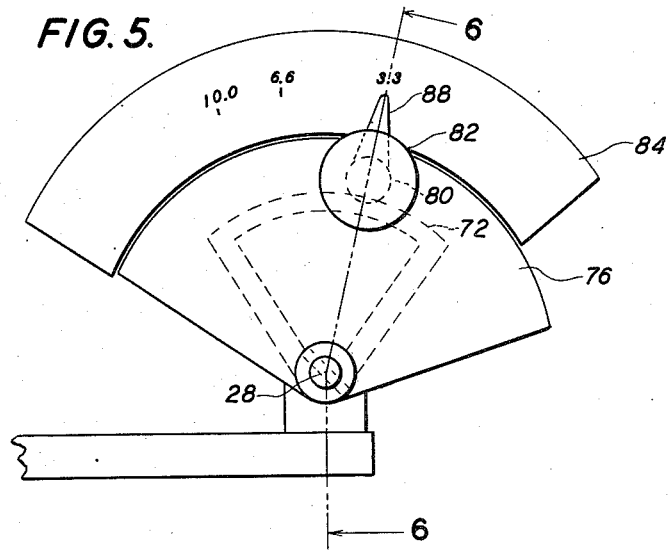
Fig. 5 is a view taken on line 5—5 of Fig. 2 which shows the arrangement for manually adjusting the speed of the roller.
Figure 6:
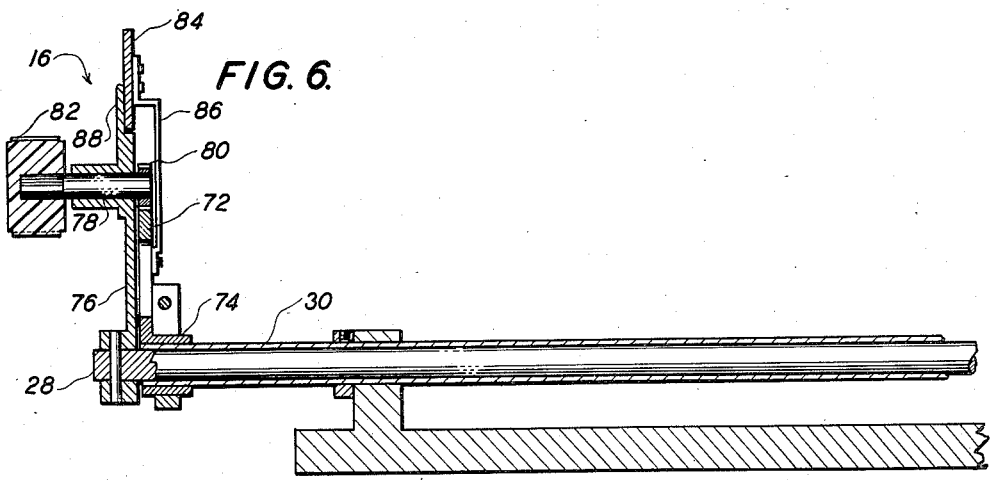
Fig. 6 is a sectional view along line 6—6 of Fig. 5 showing the apparatus of the manually-adjustable speed control.

Figs. 5 and 6 show the manually-adjustable control apparatus which provides a fixed angular relationship between the shafts 28 and 30 each time that it is set.

A segmental gear 72 is affixed to the shaft 30 by a collar 74 so that the segmental gear 72 moves with the angular movement of the shaft 30. A flange 76 is affixed to the inner shaft 28, and it carries a shaft 78 having a pinion gear 80 on one end and a knob 82 on the other end. Thus, the angular relationship between the shaft 28 and the shaft 30 can be adjusted by rotation of the knob 82 so as to cause the pinion gear to move along the segmental gear.

Since the pinion gear is carried by the shaft 28, movement of the pinion gear rotates the shaft 28 and hence sets the position of the transmission function cam 15.

An indicator plate 84 is connected to the segmental gear 72 by a bracket 86 so that the plate 84 moves with movement of the segmental gear. A pointer 88 is provided in the upper end of the flange 76 which carries the pinion gear, and this pointer serves to provide an indication of the angular relationship between the shafts 28 and 30.

As illustrated in Fig. 5, the indicator plate 84 may be provided with marks indicating the lineal velocity at which the paper is spooled onto the roll when the pointer 88 is located at the respective marks.

In operation, the knob 82 is adjusted to position the pointer 88 at the desired paper speed. This provides a continuous type or fine adjustment of the speed of the paper. As illustrated in Fig. 5, the pointer is set to provide a paper speed of 3.3 feet per minute. Adjustment of the knob 82 so as to move the pointer 88 to the desired location serves to adjust the position of the inner shaft 28 and hence the transmission function cam 15.

The dashed outline of the transmission function cam 15 in Fig. 3 shows the position of the cam when the manually-adjustable control 16 is set to the minimum paper speed of 3.3 feet per minute and when the radius of the outer periphery of the roll of paper is substantially equal to the radius of the roller 10.

The solid outline of the cam 15 in Fig. 3 shows the position of the cam when the radius of the outer periphery of the roll of paper is its maximum value. Thus, the cam moves through an arc A in order to provide a constant lineal velocity of 3.3 feet per minute when the roll of paper changes from minimum to maximum radius.

When the motor 12 is energized so as to cause paper to be spooled onto the roller 10, the radius of the roll of paper increases. The follower arm 17 follows the outer radius of the roll, and movement of the arm is conveyed through the radius function cam 18, the manually-adjustable control 16, and the transmission function cam 15 to position the control shaft 26 of the variable transmission so that the surface velocity of the roll of paper and hence the lineal velocity of the paper itself is substantially constant.

Although specific cam arrangements for the function generators 15 and 18 and a specific gear arrangement for the adjustable control 16 are employed in the preferred embodiment of the invention, it will be apparent that other arrangements may be employed. By way of example, four-bar linkages may be employed in the place of the cams, and an adjustable clamp may be employed in the place of the gears in the adjustable control 16.

I claim:

1. In a spooling system having a rotatable member upon which material is wrapped to provide a roll having a radius which increases in accordance with the amount of material which is wrapped around the member, with the rotatable member being driven by a constant speed motor through a variable transmission, a speed control mechanism for providing a continuously-adjustable, constant lineal speed of the material comprising a transmission function generator having its output connected to the variable transmission for controlling the transmission ratio of the variable transmission, a radius function generator coupled to the outer periphery of the roll of material for producing a displacement which varies with increases in the radius of the roll of material, a pair of rotatable shafts disposed coaxially, an adjustable mechanical coupling connecting the shafts together and providing a continuous adjustment of the angular relation between the shafts, and means including said shafts intercoupling the radius function generator and the transmission function generator for varying the output of the transmission function generator with the displacement produced by the radius function generator and further with a predetermined and continuously-adjustable displacement produced by adjustment of the angular relationship between said shafts.

2. In a spooling system having a rotatable member upon which material is wrapped to provide a roll having a radius which increases in accordance with the amount of material which is wrapped around the member, with the rotatable member being driven by a constant speed motor through a variable transmission, a speed control mechanism for providing a continuously-adjustable, constant lineal speed of the material comprising a transmission function cam having a surface which is coupled by a control arm to the variable transmission so that rotational movement of the cam causes the control arm to ride along the length of the surface and vary the transmission ratio of the variable transmission, a radius function generator coupled to the outer periphery of the roll of material for producing an angular movement as the radius of the roll increases, and manually-adjustable means intercoupling the radius function generator and the transmission function cam, said adjustable means including a first rotatable shaft connected to the transmission function cam for rotating said cam, a second rotatable shaft disposed coaxially with the first shaft and connected to the radius function generator for being rotated by said generator, and a mechanical coupling fixing the angular relation between the shafts so that they normally act as one shaft and transmit rotary movement from the radius function generator to the transmission function cam for maintaining the lineal speed of the material constant, said mechanical coupling being continuously adjustable for providing a fine manual adjustment of the fixed angular relation between the shafts so as to provide an adjustable predetermined displacement of the said control arm along the length of the surface of the transmission function cam and effect thereby a continuous-type adjustment of the constant speed of the material.

3. In a spooling system having a rotatable member upon which material is wrapped to provide a roll having a radius which increases in accordance with the amount of material which is wrapped around the member, with the rotatable member being driven by a constant speed motor through a variable transmission, a speed control mechanism for providing a continuously-adjustable, constant lineal speed of the material comprising a transmission function cam having a curving portion which is coupled by a control arm to the variable transmission so that rotational movement of the cam causes the control arm to ride along the length of the curving portion and vary the transmission ratio of the variable transmission, a radius function generator coupled to the outer periphery of the roll of material for producing an angular movement as the radius of the roll increases, and manually adjusting means intercoupling the radius function generator and the transmission function cam, said adjustable means including a first rotatable shaft connected to the transmission function cam for rotating said cam, a second rotatable shaft disposed coaxially with the first shaft and connected to the radius function generator for being rotated by said function generator, and a gear coupling fixing the angular relation between the shafts so that they normally act as one shaft and transmit rotary movement from the radius function generator to the transmission function cam for maintaining the lineal speed of the material constant, said gear coupling providing a continuous-type adjustment of the fixed angular relation between the shafts so as to provide a predetermined displacement of the said control arm along the length of the curving portion of the transmission function cam and effect thereby a continuous-type adjustment of the constant speed of the material.

4. In a spooling system having a rotatable member upon which material is wrapped to provide a roll having a radius which increases in accordance with the amount of material which is wrapped around the member, with the rotatable member being driven by a constant speed motor through a variable transmission, a speed control mechanism for providing a continuously-adjustable, constant lineal speed of the material comprising a transmission function generator operatively connected to said variable transmission and responsive at all times to an independent setting action for setting the transmission ratio of said variable transmission to a desired set speed, a radius function generator operatively associated with said rotatable member and responsive to the build-up of material on the rotatable member as the rotatable member is rotated, and connecting means operatively interconnecting said transmission function generator and said radius function generator, said connecting means including first means coupling at all times said transmission function generator to said radius function generator to cause movement of said transmission function generator in direct response to movement of said radius function generator to continually adjust said variable transmission to maintain constant the desired set lineal speed of the material, said connecting means including second means connected to said transmission function generator to enable independent adjustment at any time of said variable transmission through said transmission function generator without causing movement of said radius function generator to establish a different constant lineal speed of the material.

References Cited in the file of this patent
UNITED STATES PATENTS

| | | |
|---|---|---|
| 2,108,410 | Perry | Feb. 15, 1938 |
| 2,496,977 | Bechle | Feb. 7, 1950 |
| 2,568,960 | Kershaw | Sept. 25, 1951 |
| 2,626,110 | French | Jan. 20, 1953 |